United States Patent
Turng et al.

(10) Patent No.: US 11,623,381 B2
(45) Date of Patent: Apr. 11, 2023

(54) SUB-CRITICAL GAS-ASSISTED PROCESSING OF A POLYMER BLEND

(71) Applicant: Wisconsin Alumni Research Foundation, Madison, WI (US)

(72) Inventors: Lih-Sheng Turng, Madison, WI (US); Thomas K. Ellingham, Jr., Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 318 days.

(21) Appl. No.: 15/960,969

(22) Filed: Apr. 24, 2018

(65) Prior Publication Data
US 2019/0322027 A1  Oct. 24, 2019

(51) Int. Cl.
B29C 48/68   (2019.01)
B29B 9/02    (2006.01)
B82Y 30/00   (2011.01)
C08L 67/04   (2006.01)
C08L 23/12   (2006.01)

(52) U.S. Cl.
CPC .......... B29C 48/682 (2019.02); B29B 9/02 (2013.01); *B82Y 30/00* (2013.01); *C08L 23/12* (2013.01); *C08L 67/04* (2013.01)

(58) Field of Classification Search
CPC ....... B29C 48/682; B29C 44/20; B29C 47/42; B29C 44/34; B29B 9/02; B82Y 30/00; C08L 23/12; C08L 67/04; C08J 9/16
See application file for complete search history.

(56) References Cited

U.S. PATENT DOCUMENTS

| | | | | |
|---|---|---|---|---|
| 6,074,084 A * | 6/2000 | Kolossow | ............... | B29B 7/487 366/84 |
| 6,676,395 B2 * | 1/2004 | Bandera | ............... | B29C 44/348 425/4 C |
| 2008/0237914 A1 * | 10/2008 | Lustiger | ............... | C08L 51/06 264/143 |

FOREIGN PATENT DOCUMENTS

CN   101835584   * 4/2010 ............. B29C 44/34

OTHER PUBLICATIONS

Chen et al., "Mechanical properties and thermal characteristics of poly(lactic acid) and paraffin wax blends prepared by conventional melt compounding and sub-critical gas-assisted processing (SGAP)," European Polymer Journal 98 (2018), 262-272.
Ellingham et al., "Sub-critical gas-assisted processing using CO2 foaming to enhance the exfoliation of graphene in polypropylene + graphene nanocomposites," Polymer 117 (2017), 132-139.
Richards et al., "Biodegradable Composite Foams of PLA and PHBV Using Subcritical CO2," J Polym Environ (2008) 16:258-266.

* cited by examiner

*Primary Examiner* — Matthew J Daniels
*Assistant Examiner* — Shibin Liang
(74) *Attorney, Agent, or Firm* — Boyle Fredrickson, S.C.

(57) ABSTRACT

A method of processing of a polymer blend is provided. The method includes the step of introducing a polymer material and a secondary polymer material into a barrel of an extruder. A user-selected gas having a supercritical point is injected into the barrel. The user-selected gas is below the supercritical point thereof. The polymer material, the secondary polymer material and the user-selected gas are mixed within the barrel to form a polymer blend. The polymer blend is ejected from the barrel into a mold, pelletizer or the like.

14 Claims, 3 Drawing Sheets

SUB-CRITICAL GAS-ASSISTED PROCESSING OF A POLYMER BLEND

FIELD OF THE INVENTION

The present invention relates generally to injection molded polymers, and in particular, to the sub-critical, gas-assisted processing of a polymer blends, mixtures, or alloys during an extrusion operation or during an injection molding process.

BACKGROUND AND SUMMARY OF THE INVENTION

As is known, polymer blends are mixtures of two or more polymeric materials used to fabricate various types of extruded or injection-molded products. The degree of property enhancement is determined by the blend ratio and the size of the droplets of the secondary phase polymer. The smaller the secondary phase polymer droplets, the larger the contact surface area between the two polymer materials and thus the higher degree of mixing. With a high degree of mixing, polymer blends can improve the mechanical, thermal, electrical, and rheological properties of polymer articles.

Polymers injection molded or extruded with a supercritical fluid (SCF), such as carbon dioxide ($CO_2$) or nitrogen ($N_2$), can be foamed to achieve lighter weights and improved dimensional stabilities compared to their solid counterparts. This process is known as microcellular processing. In addition to the above benefits, using a SCF in polymer processing lowers the melt temperature, glass transition temperature, and viscosity of the polymer, thus making the process more energy efficient while saving on raw material costs. SCF can be used to lower the surface energy between to polymer phases, resulting in more efficient mixing; however, the effect is not universal and depends on the polymers' chemical structure. Such technologies involve using the SCF as a solvent during polymerization, or as a blowing agent either pre-loaded into the pellets under high pressure, injected into the barrel during extrusion, or used in a secondary batch process. While the results from these methods show improvements in mixing, and thus the final properties of the polymer blends, none of the methods are cost effective or scalable. Consequently, a new approach to facilitate the blending of polymers for improving the mechanical properties is highly desirable.

Therefore, it is a primary object and feature of the present invention to provide a method of sub-critical, gas-assisted processing of a polymer blend during an injection molding or extrusion operation.

It is a further object and feature of the present invention to provide a method of sub-critical, gas-assisted processing of a polymer blend during an injection molding or extrusion operation which facilitates the reduction in secondary phase droplet size in polymer blends for improving the mechanical property enhancements of the secondary phase/minor component therein.

It is a still further object and feature of the present invention to provide a method of sub-critical, gas-assisted processing of a polymer blend during an injection molding or extrusion operation which is simple to implement.

It is a still further object and feature of the present invention to provide a method of sub-critical, gas-assisted processing of a polymer blend during an injection molding or extrusion operation which is cost effective and scalable.

In accordance with the present invention, a method is provided of processing of a polymer blend. The method includes the step of introducing a polymer material and a secondary polymer material into a barrel of an extruder. A user-selected gas having a super-critical point is injected into the barrel. The user-selected gas is below the super critical point thereof. The polymer material, the secondary polymer material and the user-selected gas are mixed within the barrel to form a polymer blend. The polymer blend is ejected from the barrel.

The extruder includes a first hopper communicating with the barrel and being adapted for receiving the polymer material therein. A second hopper communicates with the barrel downstream of the first hopper and is adapted for receiving the secondary polymer material therein. The user-selected gas is injected into the barrel after the polymer material and the secondary polymer material are introduced into the barrel. The polymer blend may be ejected from the barrel into a mold or into a pelletizer.

In accordance with a further aspect of the present invention, a method is provided of processing of a polymer blend. The method includes the steps of introducing a polymer material and a secondary polymer material into the barrel of an extruder. A user-selected gas having a super-critical point is injected into the barrel downstream of the introduction of the polymer material and the secondary polymer material into the barrel. The user-selected gas is below the super-critical point thereof. The polymer material, the secondary polymer material and the user-selected gas are mixed within the barrel to form a polymer blend. The polymer material is exposed to low and high pressure zones within the barrel. Thereafter, the polymer blend is ejected from the barrel.

The user-selected gas forms bubbles in the polymer blend when the polymer blend is exposed to the low pressure zone. The bubbles in the polymer blend are compressed when the polymer blend is exposed to the high pressure zone. The extruder includes a first hopper communicating with the barrel and is adapted for receiving the polymer material therein. A second hopper communicates with the barrel downstream of the first hopper and is adapted for receiving the secondary polymer material therein. The user-selected gas is injected into the barrel after the polymer material and the secondary polymer material are introduced into the barrel. It is contemplated for the polymer blend to be ejected from the barrel into a mold or a pelletizer.

In accordance with a still further aspect of the present invention, a method is provided of processing of a polymer blend. The method includes the steps of introducing a polymer material into a barrel of an extruder and melting the polymer material in the barrel. A secondary polymer is mixed into the melted polymer material and a user-selected gas having a supercritical point is injected into the barrel. The user-selected gas is below the super critical point thereof. The polymer material, the secondary polymer material and the user-selected gas are mixed within the barrel to form a polymer blend. The polymer blend is passed through low and high pressure zones within the barrel such that the user-selected gas forms bubbles in the polymer blend when the polymer blend passes through the low pressure zone and the bubbles in the polymer blend are compressed when the polymer blend passes through the high pressure zone. The polymer blend is ejected from the barrel.

The extruder includes a first hopper communicating with the barrel and is adapted for receiving the polymer material therein. A second hopper communicates with the barrel downstream of the first hopper and is adapted for receiving the secondary polymer material therein. The polymer blend is ejected from the barrel into a mold or a pelletizer.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
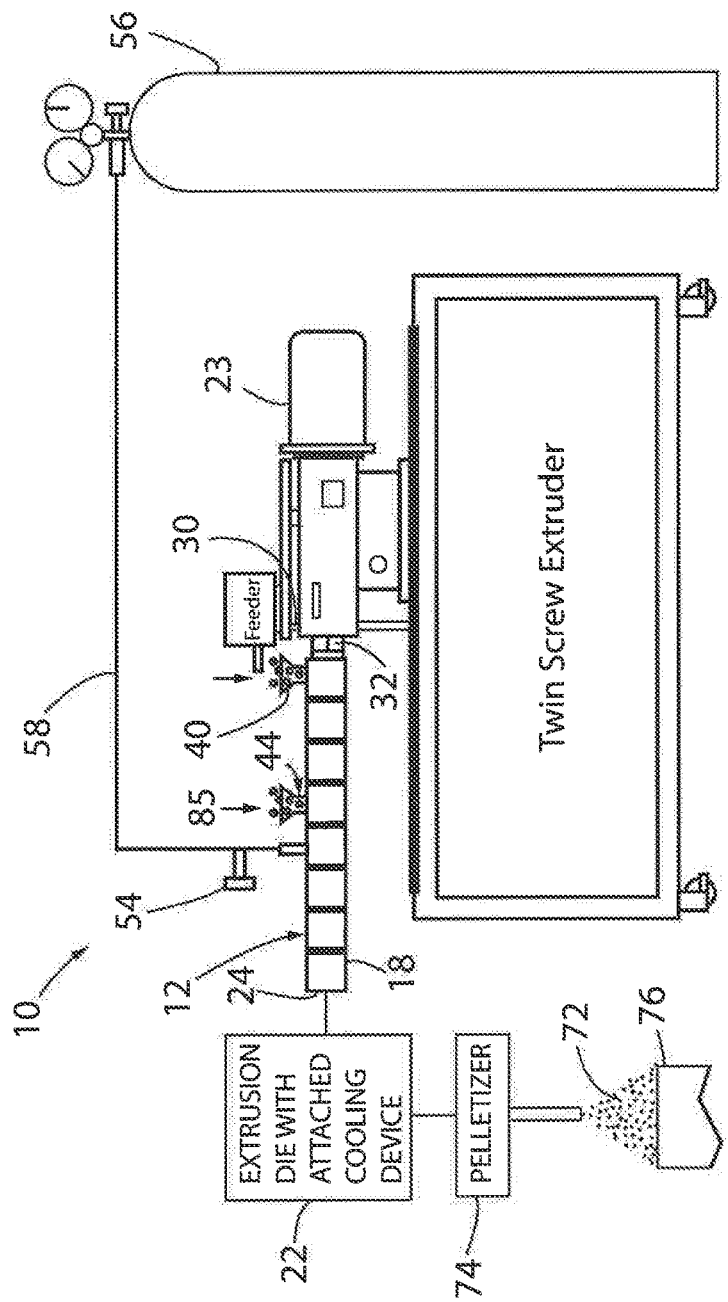
FIG. 1 is a schematic view of an apparatus for processing of a polymer nanocomposite in accordance with the methodology of the present invention.
Figure 3:
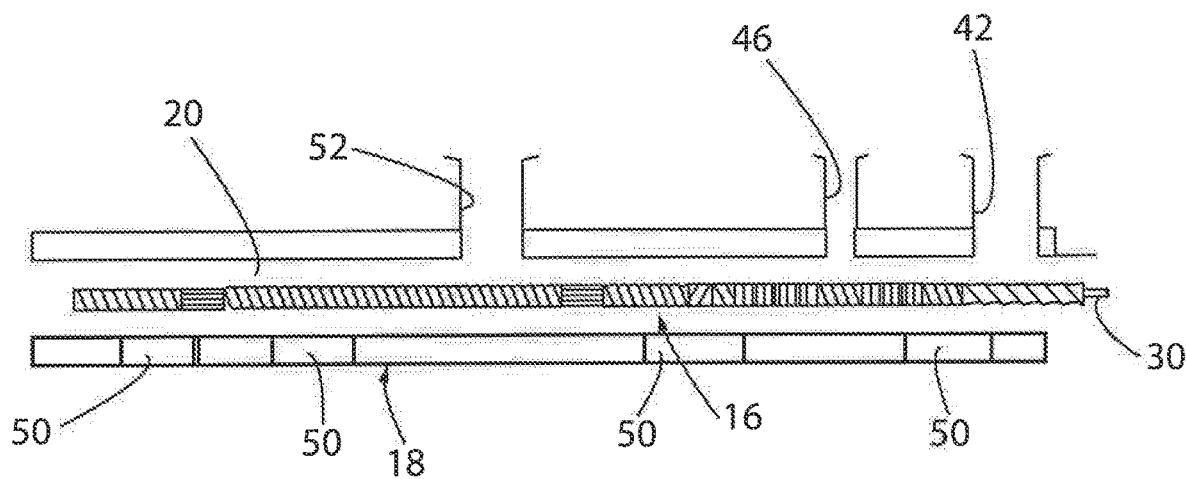
FIG. 3. is a schematic, cross-sectional view of an extruder for the apparatus of FIG. 1.
Figure 4:
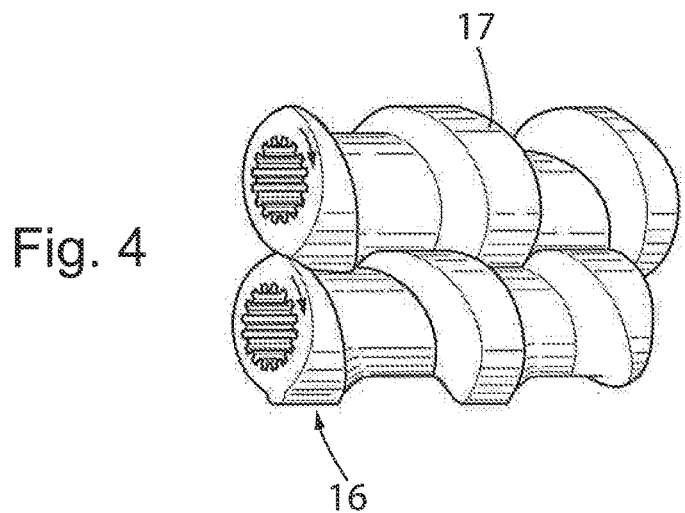
FIG. 4. is an enlarged, isometric view showing the meshing of the first and second screws of the extruder of FIG. 3.

Referring to FIG. 1, an apparatus for use in performing the methodology of the present invention is generally designated by the reference numeral 10. Apparatus 10 includes co-rotating, twin-screw extruder 12 fluidly connected to extrusion die 22. Extruder 12 includes barrel 18 adapted to receive polymeric materials that are fluidic, or can form a fluid that subsequently hardens to form a conventional, or solid, polymeric article or component. Barrel 18 includes a first end fluidly connected to extrusion die 22 through nozzle 24 and a second, opposite end having apertures extending therethrough. Drive motor 23 is operatively connected to first and second screws 16 and 17, respectively, FIGS. 3-4, by drive shafts 30 and 32, respectively, extending through corresponding apertures in second end of barrel 18. In addition, drive motor 23 is operatively connected to a controller (not shown) for controlling rotational of first and second screws 16 and 17, respectively.

Polymer processing space 20 is defined by the outer surfaces of first and second screws 16 and 17, respectively, and the inner surface of barrel 18. First and second screws 16 and 17, respectively, extend along corresponding longitudinal axes and are rotatably supported within barrel 18. As is conventional, as first and second screws 16 and 17, respectively, are rotated by drive motor 23, first and second screws 16 and 17, respectively, knead and mix the polymeric material within polymer processing space 20. In addition, rotation of first and second screws 16 and 17, respectively, conveys the polymeric material downstream within polymer processing space 20 toward extrusion die 22.

Apparatus 10 includes first hopper 40 for introducing a primary polymer material into barrel 18. The primary polymer material in first hopper 40 is delivered into polymer processing space 20 within barrel 18 through orifice 42. It is noted that the primary polymer material (e.g. polycarbonate) may be in the form of solid pellets introduced through orifice 42 and plasticized within barrel 18. In connection with the present invention, it is intended for a fluidic stream of the primary polymer material to be established in the barrel 18.

Apparatus 10 further includes a side stuffer or second hopper 44 downstream of first hopper 40 for introducing a secondary polymer, different from the primary polymer material, into barrel 18. The secondary polymer material in second hopper 44 is delivered into polymer processing space 20 within barrel 18 through orifice 46. It is noted that the material may be in the form of solid pellets introduced through orifice 44 into barrel 18.

A plurality of temperature control units 50 are positioned along barrel 18. For example, control units 50 can take any suitable form such as electrical heaters or the like. It is intended for control units 50 to heat/cool the stream of polymeric material within barrel 18 to facilitate melting and/or cooling of the polymeric stream and control the viscosity thereof. Control units 50 can operate differently at different locations along barrel 18. For example, a first portion of control units 50 may heat the stream at one or more locations along barrel 18, while a second portion of the control units 50 may cool the stream at one or more different locations along barrel 18.

Apparatus 10 further includes at least one port 52 fluidly connecting pressure regulator and metering device 54 to polymer processing space 20 within barrel 18 by line 55. Pressure regulator and metering device 54 is fluidically coupled to compressed gas source 56 by line 58. As hereinafter described, it is intended for a compressed, user-selected gas from gas source 56 to be introduced in polymer processing space 20 within barrel 18 at a pressure and a temperature below the supercritical point of the user-selected gas to allow for foaming to occur within the polymeric stream flowing through barrel 18 and upon exit of the polymeric stream from extruder 12. A reverse-flow element may be positioned adjacent port 52 upstream thereof to prevent the backflow of the user-selected gas within polymer processing space 20 of barrel 18.

In operation, it is contemplated to provide a primary polymer material, e.g., polycarbonate, polystyrene, polypropylene or low-density polyethylene, in a pelletized form in first hopper 40. Other polymers are possible without deviating from the scope of the present invention. A secondary polymer material, such as polycarbonate, polystyrene, polypropylene or low-density polyethylene, in a pelletized form, is provided in second hopper 44. Other polymers are possible without deviating from the scope of the present invention. The pelletized polymer material in first hopper 40 is delivered into polymer processing space 20 in barrel 18 through orifice 42. First and second screws 16 and 17, respectively, are rotated to urge the polymeric material downstream such that the mechanical energy generated by rotation of first and second screws 16 and 17, respectively, and control units 50 plasticize the polymeric material in polymer processing space 20 in barrel 18 to form a polymeric stream in polymer processing space 20 in barrel 18.

As the polymeric stream flows downstream in polymer processing space 20 in barrel 18, the secondary polymer material in side stuffer or second hopper 44 is introduced into polymer processing space 20 within barrel 18 through orifice 46. The secondary polymer material is kneaded and mixed into the polymeric stream material via first and second screws 16 and 17, respectively, to form a stream of polymer blend material within polymer processing space 20 of barrel 18. Thereafter, as the stream of polymer blend material downstream within polymer processing space 20 of barrel 18 flows downstream, the user-selected gas (e.g. nitrogen or carbon dioxide gas) from gas source 56 is introduced into polymer processing space 20 of barrel 18 through port 52. It can be appreciated that other gases besides nitrogen and/or carbon dioxide gas may be used without deviating from the scope of the present invention. It is intended for the user-selected gas to be introduced into polymer processing space 20 of barrel 18 at a selected pressure and temperature below the supercritical point thereof. By way of example, it is contemplated to introduce the user-selected gas at a pressure approximately 50 pounds per square inch ("psi") greater than the measured pressure of the stream of polymer blend material at the exit barrel 18. Hence, if the pressure of the stream of polymer blend material at the exit barrel 18 is approximately 250 psi, the pressure of the user-selected gas introduced at port 52 by pressure regulator and metering device 54 could be set by at approximately 300 psi, well below the supercritical pressure for $CO_2$ (1070 psi). This gas pressure can be varied up to but not including the supercritical pressure without deviating from the scope of the present invention.

As the user-selected gas is introduced into polymer processing space 20 of barrel 18, the user-selected gas is kneaded and mixed into the stream of polymer blend material via first and second screws 16 and 17, respectively, as the stream of polymer blend material flows downstream in polymer processing space 20 within barrel 18. More specifically, as the stream of polymer blend material flows downstream in polymer processing space 20 within barrel 18, the stream of polymer blend material encounters multiple high and low-pressure zones within polymer processing space 20. The low-pressure areas induce dissolution and foaming of the user-selected gas to occur within the stream of polymer blend material flowing through barrel 18. The foaming introduces an equibiaxial flow on the surface of the expanding bubbles in the stream of polymer blend material that reduces the droplet size of the secondary polymer material in the stream of polymer blend material. In the high-pressure areas, the bubbles are subject to compressions and a shear flow. As a result, the bubbles collapse upon each other, thereby creating a local interfacial layering of the polymer blend material. This, in turn, increases the surface area of contact between the polymeric materials in the polymer blend material, thereby resulting in a more thorough mixing of the polymer blend material without expending any additional mechanical or thermal energy input.

The mixed polymer blend material is fed into extrusion die 22 wherein a strand of polymer blend material is formed and is cooled, e.g. by means of a water bath, or alternatively, by vortex gas cooling tubes or an air blade. Thereafter, the strand of polymer blend material is fed to pelletizer 74, wherein the strand is chopped or otherwise cut into suitably sized pellets 72 and received in a container or bin 76. Pellets 72 may be oven dried to remove the moisture content thereof. Once produced, pellets 72 may be used in a conventional, injection molding machine to produce a desired component.

Figure 5:
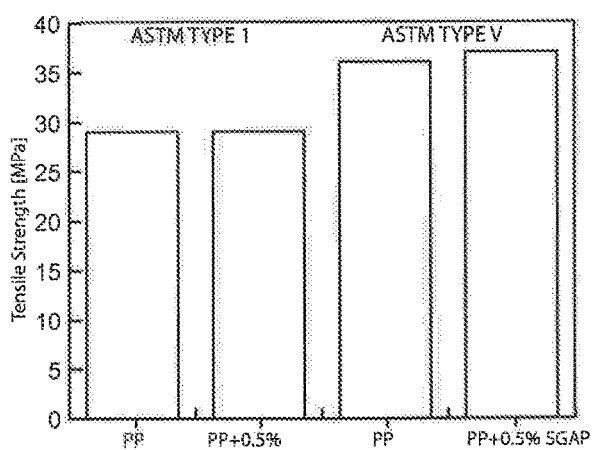
FIG. 5 is a graphical comparison between droplet size diameters of components fabricated in accordance with the methodology of the present invention and components fabricated with a conventional twin screw extrusion melt blending process.

Referring to FIG. 5, a series of test bars were molded from pellets 72 fabricated from the methodology heretofore described in order to examine the properties of components fabricated in accordance with the methodology of the present invention, as compared to components fabricated with a conventional twin screw extrusion melt blending process. Using a conventional twin screw extruder machine, pellets of polypropylene (PP) having 10% polycaprolactone (PCL) added thereto were fabricated via conventional melt blending. A test bar was then molded from the pellets using a conventional injection molding machine. In addition, a test bar was molded from pellets extruded from PP having 10% PCL added thereto utilizing the methodology of the present invention (hereinafter referred to as the sub-critical, gas-assisted processing (SGAP) test bar and identified as PP+10% PCL SGAP in FIG. 5). The test results show that the distribution of droplet size diameters in the SGAP test bar is shifted to lower diameters and a sharper peak, representing a phase size close to the lower limit attainable utilizing twin-screw extruder 12 as configured. The sample distribution of droplet size diameters in the test bar fabricated utilizing the conventional twin screw extrusion melt blending process is shifted to larger diameters (and less contact surface area between the phases) and its peak is more broad. This sample distribution is indicative of a non-uniform distribution of droplet size diameters in the test bar fabricated utilizing the conventional microcellular injection molding process, which adversely effects the material properties of the test bar. As such, it can be appreciated that the added stresses of bubble expansion incurred utilizing the SGAP methodology of the present invention process increases the mixing efficiency of twin-screw extruder 12. This added stress helps to stretch and break up the secondary polymer into smaller droplets, thereby increasing the surface area of contact between the primary and secondary polymer materials in the polymer blend and enhancing the material properties of the test bar.

Figure 6:
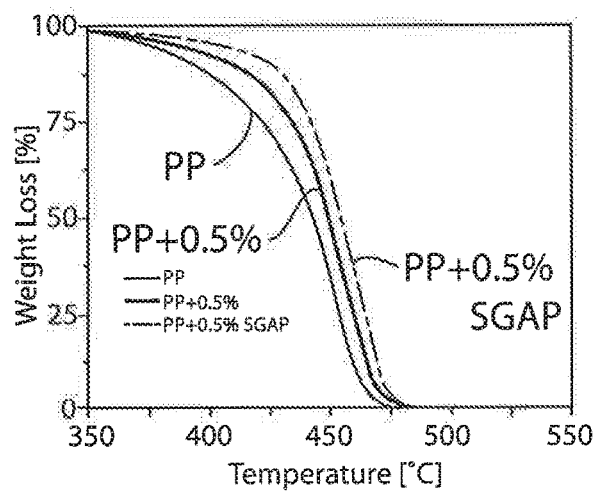
FIG. 6 is a graphical comparison of the strain at breakage for samples of various materials.
Figure 7:
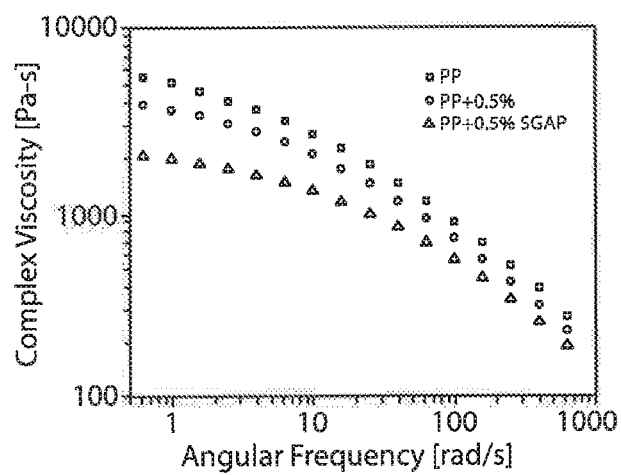
FIG. 7 is a graphical representation of the viscosity of various materials versus the angular frequency of the various material traveling through an extruder during the methodology of the present invention.

Referring to FIG. 6, the strain-to-break results for test bars fabricated from: 1) neat PP in accordance with a conventional twin screw extrusion melt blending process; 2) PP fabricated in accordance with the methodology of the present invention (identified as PP SGAP in FIG. 6); 3) PP having 10% PCL added thereto in accordance with a conventional twin screw extrusion melt blending process; and 4) PP having 10% PCL added thereto in accordance with the methodology of the present invention (identified as PP+10% PCL SGAP in FIG. 6). The strain-to-break results indicate that the neat PP test bars fabricated in accordance with a conventional twin screw extrusion melt blending process and in accordance with the methodology of the present invention have approximately the same strain at break. However, the test bar fabricated with PP having 10% PCL added thereto in accordance with the methodology of the present invention performs better than the test bar fabricated from PP having 10% PCL added thereto in accordance with a conventional twin screw extrusion melt blending process. Overall, the inclusion of PCL in the polymer blend used to fabricate the test bars does decrease the strain-at-break compared to the test bars fabricated from neat PP. But, this decrease in the strain-at-break is minimized in the test bar fabricated with PP having 10% PCL added thereto in accordance with the methodology of the present invention due to the secondary phase size being smaller.

Figure 2:
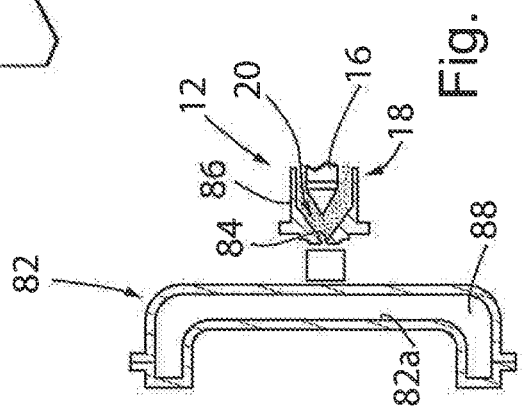
FIG. 2 is a schematic, cross-sectional view showing a portion of an alternate apparatus for processing of a polymer blend in accordance with the methodology of the present invention.

Referring to FIG. 2, an alternate apparatus for effectuating the methodology of the present invention is generally designated by the reference number 80. More specifically, apparatus 80 may take of the form of an injection molding machine having a modified extruder 12 fluidically connected to mold 82. As heretofore described, first and second screws 16 and 17, respectively, within barrel 18 are configured to convey polymeric material downstream within polymer processing space 20 toward the first end of barrel 18. The first end of barrel 18 is fluidly connected to mold 82 through nozzle 84. Further, in addition to controlling the rotational movement of first and second screws 16 and 17, respectively, drive motor 23 controls the axial movement of first and second screws 16 and 17, respectively, for reasons hereinafter described.

In operation, a stream of polymer blend material having user-selected gas at a selected pressure and temperature below the supercritical point thereof introduced therein is provided within polymer processing space 20 of barrel 18, as heretofore described. First and second screws 16 and 17, respectively, cause the stream of polymer blend material to accumulate in accumulation region 86 at the first end of barrel 18. It is intended for first and second screws 16 and 17, respectively, to maintain sufficient back pressure at all times to prevent the loss of pressure within extruder 12. Once a sufficient volume of polymer blend material has accumulated in the accumulation region 86, first and second screws 16 and 17, respectively, are moved in a downstream direction so as to inject the polymer blend material through the exit in barrel 18 into mold 82. It can be understood that the pressure drop in mold 82 causes additional bubbles to form in the polymer blend material. After injection, first and second screws 16 and 17, respectively, are retracted in upstream direction by drive motor 23. The process heretofore described is repeated such that the polymer blend material, once again, accumulates in the accumulation region 86 for the next injection.

As is conventional, the polymer blend material received in the molding chamber 88 of mold 82 begins to cool as soon as the polymer blend material contacts inner surface 82a of mold 82. Molding chamber 88 mold 82 is filled with the polymer blend material and the polymer blend material solidifies into a part as it cools. After a sufficient time period has passed, the cooled part may be ejected from mold 82. As is conventional, the size and shape of the fabricated component corresponds to the size and shape of molding chamber 88 of mold 82. Once the fabricated component has been ejected from mold 82, mold 82 is closed and the process may be repeated. It can be appreciated that by introducing the user-selected gas into the polymer blend material, the contact surface area between the two polymer materials in the polymer blend is enhanced, thereby harnessing the mechanical, thermal, and electrical property enhancements of such a blend.

Various modes of carrying out the invention are contemplated as being within the scope of the following claims particularly pointing and distinctly claiming the subject matter that is regarded as the invention.

We claim:

1. A method of processing of a polymer blend, comprising the steps of:
   introducing a polymer material into a barrel of an extruder;
   melting the polymer material in the barrel;
   introducing a secondary polymer material into the melted polymer material in the barrel of the extruder;
   mixing the secondary polymer material into the melted polymer material to form a stream of polymer blended material within the barrel;
   injecting a user-selected gas having a supercritical point into the stream of polymer blended material in the barrel, the user-selected gas being below the supercritical point thereof;
   mixing the user-selected gas into the stream of polymer blended material within the barrel to form a polymer blend;
   exposing the user-selected gas and the stream of polymer blended material to multiple low pressure zones and multiple high pressure zones within the barrel as the user-selected gas is mixed into the stream of polymer blended material within the barrel, wherein at least one of the multiple low pressure zones is downstream of at least one of the multiple high pressure zones; and
   ejecting the polymer blend from the barrel.

2. The method of claim 1 wherein the extruder includes:
   a first hopper communicating with the barrel and being adapted for receiving the polymer material therein; and
   a second hopper communicating with the barrel downstream of the first hopper and adapted for receiving the secondary polymer material therein.

3. The method of claim 1 wherein the polymer blend is ejected from the barrel into a mold.

4. The method of claim 1 wherein the polymer blend is ejected from the barrel into a pelletizer.

5. A method of processing of a polymer blend, comprising the steps of:
   introducing a polymer material into the barrel of an extruder;
   melting the polymer material in the barrel;
   introducing a secondary polymer material into the melted polymer material in the barrel of the extruder;
   mixing the secondary polymer material into the melted polymer material to form a stream of polymer blended material within the barrel;
   injecting a user-selected gas having a supercritical point into the stream of polymer blended material within the barrel downstream of the introduction of the polymer material and the secondary polymer material into the barrel, the user-selected gas being below the supercritical point thereof;
   mixing the user-selected gas and the stream of polymer blended material within the barrel to form a polymer blend;
   exposing the polymer blend to multiple low pressure zones and to multiple high pressure zones as the polymer blend is mixed within the barrel; and
   ejecting the polymer blend from the barrel;
   wherein at least one of the multiple low pressure zones is downstream of at least one of the multiple high pressure zones.

6. The method of claim 5 wherein the user-selected gas forms bubbles in the polymer blend when the polymer blend is exposed to each of the low pressure zones.

7. The method of claim 6 wherein the bubbles in the polymer blend are compressed when the polymer blend is exposed to each of the high pressure zones.

8. The method of claim 5 wherein the extruder includes:
   a first hopper communicating with the barrel and being adapted for receiving the polymer material therein; and
   a second hopper communicating with the barrel downstream of the first hopper and being adapted for receiving the secondary polymer material therein.

9. The method of claim 5 wherein the polymer blend is ejected from the barrel into a mold.

10. The method of claim 5 wherein the polymer blend is ejected from the barrel into a pelletizer.

11. A method of processing of a polymer blend, comprising the steps of:
    introducing a polymer material into a barrel of an extruder;
    melting the polymer material in the barrel;
    mixing a secondary polymer material into the melted polymer material to form a stream of polymer blended material within the barrel;

injecting a user-selected gas having a supercritical point into the stream of polymer blended material within the barrel, the user-selected gas being below the supercritical point thereof;

mixing the stream of polymer blended material and the user-selected gas within the barrel to form a polymer blend;

passing the polymer blend through multiple low pressure zones and to multiple high pressure zones within the barrel as the stream of polymer blended material and the user-selected gas are being mixed in the barrel, such that the user-selected gas forms bubbles in the polymer blend when the polymer blend passes through the low pressure zone and the bubbles in the polymer blend are compressed when the polymer blend passes through the high pressure zone; and ejecting the polymer blend from the barrel;

wherein at least one of the multiple low pressure zones is downstream of at least one of the multiple high pressure zones.

12. The method of claim 11 wherein the extruder includes:
a first hopper communicating with the barrel and being adapted for receiving the polymer material therein; and
a second hopper communicating with the barrel downstream of the first hopper and being adapted for receiving the secondary polymer material therein.

13. The method of claim 11 wherein the polymer blend is ejected from the barrel into a mold.

14. The method of claim 11 wherein the polymer blend is ejected from the barrel into a pelletizer.

* * * * *